US008852430B2

(12) United States Patent
Huang

(10) Patent No.: US 8,852,430 B2
(45) Date of Patent: Oct. 7, 2014

(54) WATER TREATMENT DEVICE

(75) Inventor: Hann Huang, Taichung (TW)

(73) Assignee: Hann Huang, Taichung (TW)

( * ) Notice: Subject to any disclaimer, the term of this patent is extended or adjusted under 35 U.S.C. 154(b) by 614 days.

(21) Appl. No.: 13/219,714

(22) Filed: Aug. 29, 2011

(65) Prior Publication Data
US 2012/0125831 A1    May 24, 2012

(30) Foreign Application Priority Data

Nov. 23, 2010   (TW) .............................. 99140441 A

(51) Int. Cl.
C02F 9/12 (2006.01)
C02F 1/00 (2006.01)
C02F 1/28 (2006.01)
C02F 1/30 (2006.01)
C02F 1/48 (2006.01)
A23L 2/70 (2006.01)
C02F 9/00 (2006.01)

(52) U.S. Cl.
CPC . C02F 9/005 (2013.01); *A23L 2/70* (2013.01); *C02F 1/481* (2013.01); *C02F 1/001* (2013.01); *C02F 1/005* (2013.01); *C02F 1/283* (2013.01); *C02F 1/30* (2013.01); *C02F 1/482* (2013.01); *C02F 2209/005* (2013.01)
USPC ...... 210/223; 210/695; 210/748.09; 210/222; 210/243; 210/244; 210/258; 210/259; 210/295; 204/157.15

(58) Field of Classification Search
CPC .......... A23L 2/70; C02F 9/005; C02F 1/001; C02F 1/005; C02F 1/283; C02F 1/481; C02F 1/482; C02F 1/30; C02F 2209/005
USPC ............. 210/695, 748, 9, 222, 223, 243, 258, 210/259, 295, 244; 204/157.15
See application file for complete search history.

(56) References Cited

U.S. PATENT DOCUMENTS

| 6,527,953 B2 * | 3/2003 | Tai ................................. 210/223 |
| 7,229,561 B1 * | 6/2007 | Hamanaka et al. ........... 210/222 |
| 7,658,845 B2 * | 2/2010 | Lee ............................... 210/223 |

* cited by examiner

*Primary Examiner* — David A Reifsnyder
(74) *Attorney, Agent, or Firm* — Yuwen Guo

(57) ABSTRACT

A water treatment device includes a control module communicating with a feed line; an energy pipe communicating with the control module; a light wave pipe assembly communicating with the energy pipe; and magnetizing pipe communicating with the light wave pipe assembly through the second manifold then with an exit line. The light wave pipe assembly communicates with the light wave generator so that the wave guide tube grants the light wave energy to the water liquid. The magnetic energy of magnets of the magnetizing pipe magnetizes the water liquid. Furthermore, with the use of multiple loops which refine molecules of the water liquid, the energy of the water liquid increases to allow the water liquid to be easily absorbed by human body.

7 Claims, 15 Drawing Sheets

WATER TREATMENT DEVICE

BACKGROUND OF THE INVENTION

1. Field of the Invention

The present invention relates to a water treatment device, and particularly to a water treatment device which refines water liquid by means of magnetization and light wave energy treatment.

2. Description of Related Art

Conventional water treatment includes filtering, distillation/reverse osmosis, electro-ion treatment and magnetization treatment. For the filtering, only impurities in water liquid can be filtered out, and nothing to do with the molecules of water liquid themselves. For the distillation/reverse osmosis, it has the similar effect with the filtering method which can only remove impurities in the water liquid. For the electro-ion treatment, voltage is applied to molecules of water liquid for ionization so as to make the water liquid alkaline, although there is no significant effect of increasing the energy of the molecules of the water liquid. For magnetization, the water liquid flows through magnetic piping having magnets so that the action of magnetic lines of the magnetic field refines the molecules of the water liquid. There is no significant effect on increasing the energy of the molecules of the water liquid.

Therefore, there is a need of a novel water treatment device which overcomes the above disadvantages.

SUMMARY OF THE INVENTION

The object of the present invention is to provide a water treatment device which refines molecules of water liquid and increases the energy of water liquid by far-infrared rays, light wave energy and magnetization so that the treated water can be easily absorbed by human body.

In order to achieve the above and other objectives, the water treatment device of the invention includes a control module communicating with a feed line; an energy pipe communicating with the control module; a light wave pipe assembly communicating with the energy pipe; and a magnetizing pipe communicating with the light wave pipe assembly through a second manifold and then connected to an exit line.

The second manifold communicates with a first manifold which connects to a pump. The pump communicates with an exit port of the light wave pipe assembly and an exit port of a fluid pipe through a third manifold. A porous far-infrared ceramic sheet is mounted inside the fluid pipe and has a dust-proof cover and a dust-proof tube.

An exit port of the energy pipe communicates with a flow control valve, and then with a feed port of the light wave pipe assembly.

The control module communicates with a calcium-ion bead filtering tube an exit port of which communicates with the exit port of the energy tube.

A first filtering component connects the feed line to the control module. A second filtering component connects the light wave pipe assembly to the second manifold.

The light wave pipe assembly includes a light wave generator which guides the light wave energy into the light wave pipe assembly. The light wave pipe assembly has an outer tube, an upper diversion tube, a lower diversion tube, a transparent tube and a wave guide tube. The transparent tube is mounted inside the outer tube. The wave guide tube is mounted inside the transparent tube so as to allow the wave guide tube to guide light waves to pass through. The upper diversion tube is mounted at a feed port of the outer tube and communicates with the exit port of the energy pipe. The lower diversion tube is mounted at the exit port of the outer tube.

The transparent tube is a quartz tube. The wave guide tube is made of metallic conductor such as gold or copper. Outer walls of the outer pipe have a plurality of powerful magnets having N, S poles corresponding to each other.

The upper diversion tube is of L-shaped structure and downwardly mounted. The lower diversion tube is of L-shaped structure and upwardly mounted. The upper diversion tube is positioned in a right-left reverse manner to the lower diversion tube. One end of the upper diversion tube communicating with the outer tube has an upper flowing port in the same direction as the opposite end of the upper diversion tube away from the outer tube. One end of the lower diversion tube communicating with the outer tube has a lower flowing port in the same direction as the opposite end of the lower diversion tube away from the outer tube.

The control module includes a first tube and a second tube. A feed port of the first tube communicates with the feed line. An exit port of the first tube communicates with a feed port of the energy pipe. The first tube has an upper manifold and a lower manifold. The second tube has an upper manifold and a lower manifold. The upper manifold of the first tube communicates with the upper manifold of the second tube through a connecting tube. An exit port of the second tube communicates with a calcium-ion bead filtering pipe. An exit port of the calcium-ion bead filtering pipe communicates with an exit port of the energy pipe.

A far-infrared material such as one or more of ceramic stone, mineral stone and tourmaline is placed inside the energy pipe. A plurality of magnetic circular sheets is mounted in the magnetizing pipe at intervals in a manner N, N poles are opposite to each other or S, S poles are opposite to each other.

The effect of the invention is as follows. By communicating the light wave pipe assembly with the light wave generator so that the wave guide tube grants the light wave energy to the water liquid. The magnetic energy of magnets of the magnetizing pipe magnetizes the water liquid. Furthermore, with the use of multiple loops to refine molecules of the water liquid, the energy of the water liquid increases to allow the water liquid to be easily absorbed by human body.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
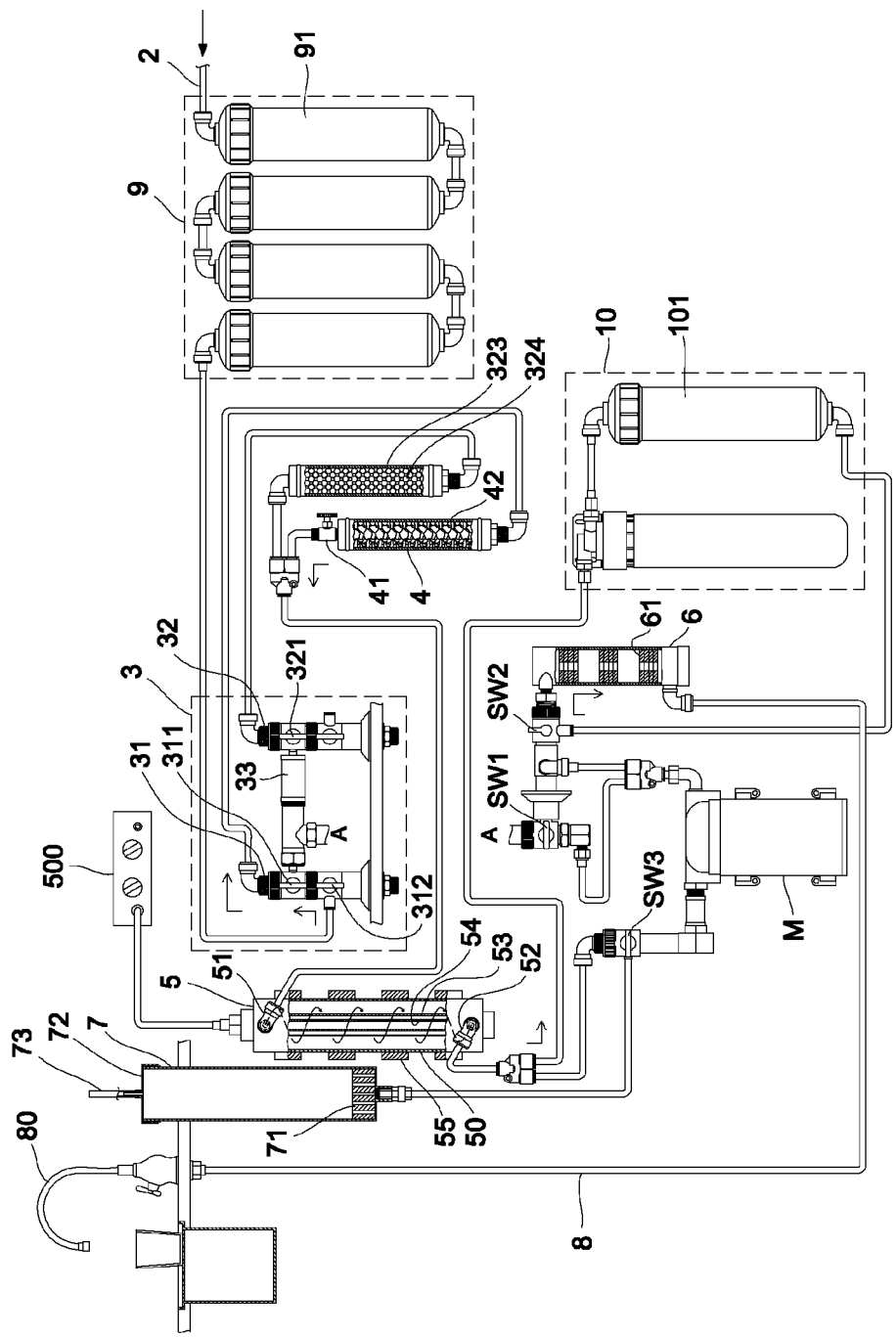
FIG. 1 is a schematic view of a structure of a water treatment device according to one embodiment of the invention.

FIG. 1 is a schematic view of a structure of a water treatment device according to one embodiment of the invention. Referring to FIG. 1, the water treatment device 1 includes a feed line 2, a control module 3, an energy pipe 4, a light wave pipe assembly 5, a pump M, a magnetization pipe 6, a fluid pipe 7 and an exit line 8.

Figure 3A:
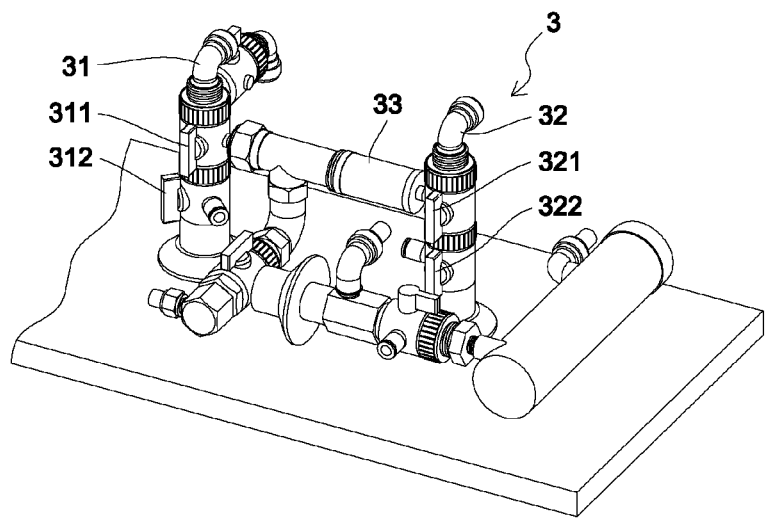
FIG. 3a is a schematic view of a structure of a control module in a water treatment device according to one embodiment of the invention.
Figure 3B:
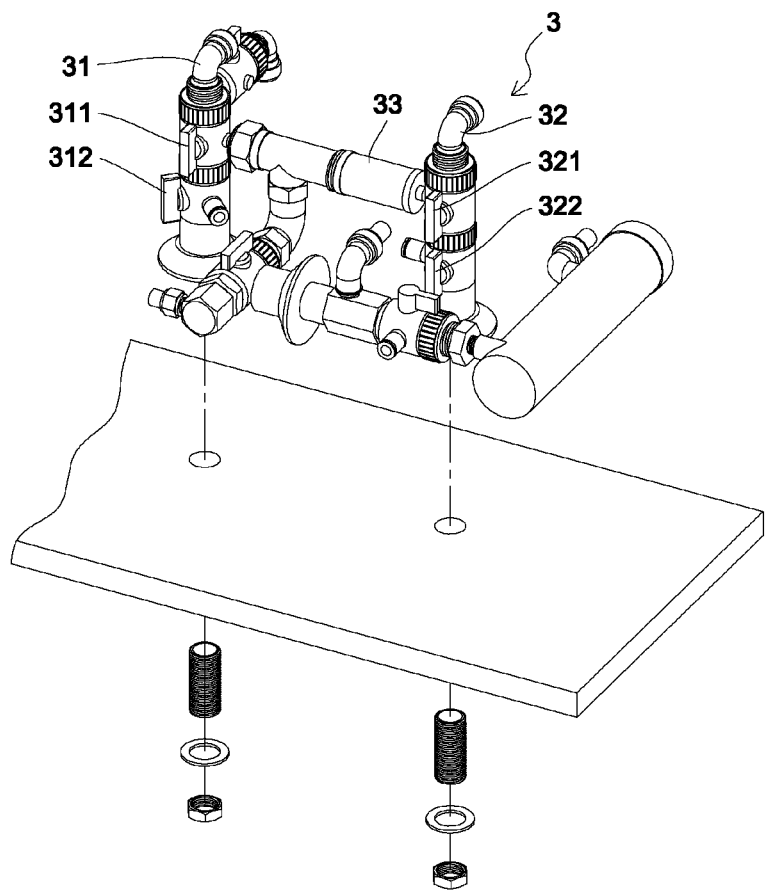
FIG. 3b is a schematic exploded view of a part of a control module in a water treatment device according to one embodiment of the invention.

FIG. 3a is a schematic view of a structure of a control module in the water treatment device according to one embodiment of the invention. FIG. 3b is an exploded view of a part of the control module in the water treatment device according to one embodiment of the invention. Please also refer to FIG. 3a and FIG. 3b, the control module 3 is used to control water flow path, including a single-filter magnetizing treatment, multiple loop treatment and a fluid magnetizing treatment. The control module 3 includes a first tube 31 and a second tube 32. A feed port of the first tube 31 communicates with the feed line 2. An exit port of the first tube 31 communicates with the feed port of the energy pipe 4. The first tube 31 has an upper manifold 311 and a lower manifold 312. The first Two-tube 32 also has an upper manifold 321 and a lower manifold 322. The upper manifold 311 of the first tube 31 communicates with the upper manifold 321 of the second tube 32 through a connecting tube 33.

Preferably, the feed line 2 communicates with a first filtering component 9 and the first tube 31 in turns. The first filtering component 9 includes a plurality of filtering tubes 91 (the invention is exemplified, but not limited to, the following four embodiments). Each filtering tube 91 can be a cotton filter, resin filter, activated carbon filter, sterilized filter, carbon fiber filter etc. The cotton filter can filter out sludge, rust, eggs, and spores in water liquid. The activated carbon filter removes the residual chlorine (Cl), odor, organic toxic substances, and pesticides in water liquid. The anti-bacteria filter can filter out bacteria E. coli and scale. The carbon fiber filter makes water taste better, release negative ions and alkalinize the water liquid. Obviously, the filtered water liquid through the filtering tubes 91 of the filtering component 9 has improved water quality.

Furthermore, the second tube 32 can further communicate with a feed port of a calcium-ion bead filtering pipe 323 while an exit port of the calcium-ion bead filtering pipe 323 communicates with an exit port of the energy pipe 4. The calcium-ion bead filtering pipe 323 can use calcium-ion beads 324 to generate negative ions, various trace elements and amino acids, and alkalinize the water liquid.

A feed port of the energy pipe 4 communicates with an exit port of the first tube 31. The exit port of the energy pipe 4 can further connect to a flow control valve 41 and then to the exit port of the calcium-bead filtering pipe 323, while connected to an upper diversion tube 51 of the light wave pipe assembly 5. By controlling the flow control valve 41 to adjust the flow of water liquid into the light wave pipe assembly 5. Furthermore, a far infrared material 42, such as ceramic stone, mineral stone, tourmaline, etc., can be inside the energy pipe 4 so that the water liquid can be subject to far-infrared treatment.

Figure 4A:
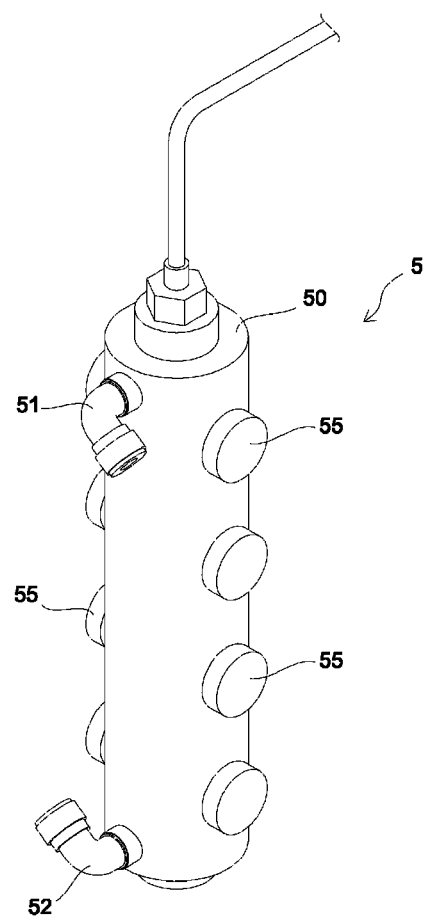
FIG. 4a is a perspective view of a light wave pipe assembly in a water treatment device according to one embodiment of the invention.
Figure 4B:
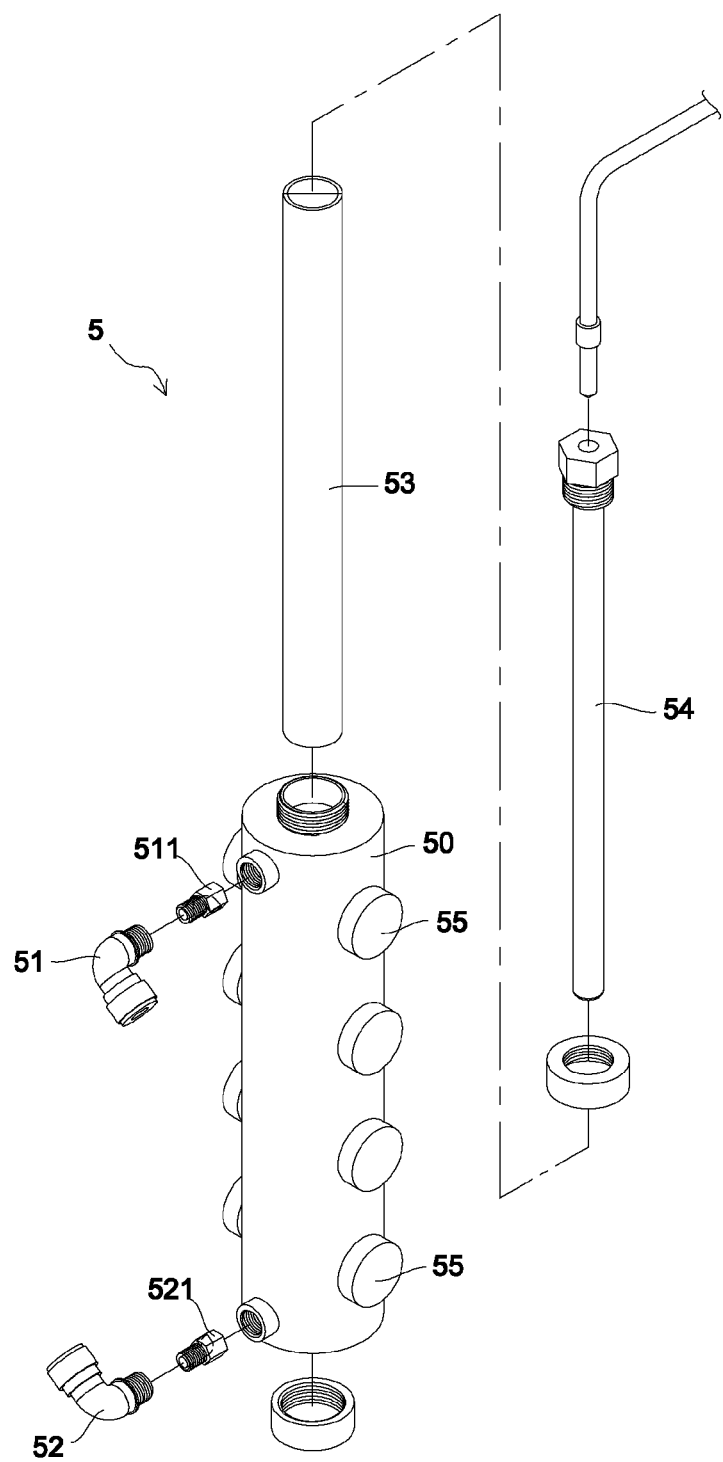
FIG. 4b is a schematic exploded view of a light wave pipe assembly of a water treatment device according to one embodiment of the invention.
Figure 4C:
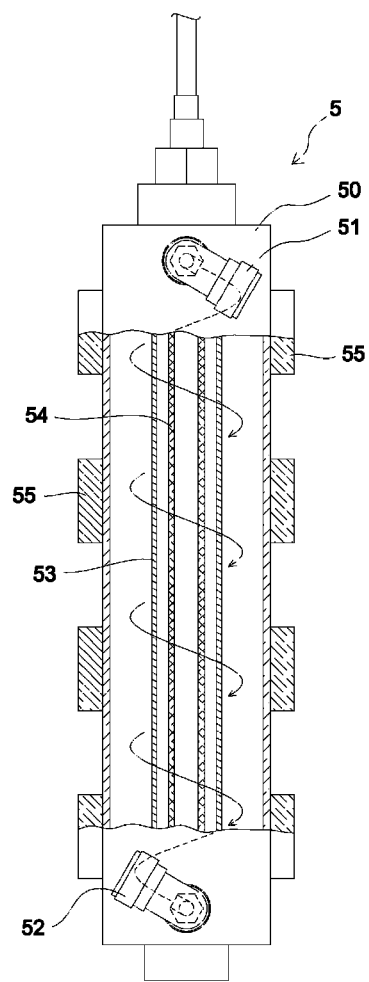
FIG. 4c is a schematic view showing water flow status in a light wave pipe assembly of a water treatment device according to one embodiment of the invention.

Please also refer to FIG. 4a, FIG. 4b and FIG. 4c. FIG. 4a is a perspective view of a light wave pipe assembly in the water treatment device according one embodiment of the invention. FIG. 4b is an exploded view of a light wave pipe assembly in the water treatment device according one embodiment of the invention. FIG. 4c is a schematic view of water flow in a light wave pipe assembly in the water treatment device according one embodiment of the invention.

The light wave pipe assembly 5 consists of a light wave generator 500 which guides the light wave energy into the light wave pipe assembly 5. The light wave pipe assembly 5 has an outer tube 50, an upper diversion tube 51, a lower diversion tube 52, a transparent tube 53 and a wave guide tube 54. The transparent tube 53 can be made of transparent materials (such as quartz tube) and mounted inside the outer tube 50. The wave guide tube 54 can be made of metallic conductor (such as gold, copper, etc.) and mounted inside the transparent tube 53 in order to guide light waves to travel through. The upper diversion tube 51 can be of L-shaped structure and downwardly mounted at a feed port of the outer tube 50, and communicates with a confluence between the exit port of the calcium-ion bead filtering pipe 323 and the exit port of the energy pope 4. The lower diversion tube 52 is of L-shaped structure and upwardly mounted at the exit port of the outer tube 50, and communicate with a second filtering component 10 (having a filtering tube 101 with the same function as the filter tube 91) and a third manifold SW3. The upper diversion tube 51 is positioned in a right-left reverse manner to the lower diversion tube 52. One end of the upper diversion tube 51 communicating with the outer tube 50 has an upper flowing port 511 in the same direction as the opposite end of the upper diversion tube 51 away from the outer tube 50. The lower diversion tube 52 communicates with one end of the outer tube 50, and has a lower flowing port 521 in the same direction as the opposite end of the lower diversion tube 52 away from the outer tube 50. Such a configuration allows water liquid to surround the transparent tube 53 in form of whirlpool between the outer tube 50 and the transparent tube 53 so the water liquid can be distributed evenly at 360 degrees for light energy treatment.

Preferably, outside the outer wall of outer tube 50 is further mounted a plurality of powerful magnets 55 (N, S poles are positioned in a manner of corresponding to each other) to strengthen the light energy treatment to the water liquid.

When the wave generator 500 is in the current conduction, the wave guide tube 54 immediately generates appropriate oscillation frequency. Ions in the water liquid between the outer tube 50 and the transparent tube 53 impact each other. The magnetic energy of the powerful magnet on the outer wall of the outer tube 50 further interacts with the electromagnetic field generated by the wave guide tube 54. With the use of liquid water molecules in the whirlpool, charged particles are driven to accelerate the rotation and then become high-energy small water molecules. From Einstein equation $E=mc^2$, it is known that the energy and the speed of light can be mutually converted. Multiple loops of the light and the magnetized fluid through the water molecules contribute to increase the energy of water liquid.

One end of the pump M connects to the third manifold SW3, while the other end of the pump M connects to a first manifold SW1 and a second manifold SW2. The first manifold SW1 communicates with the connecting tube 33, while the second manifold SW2 communicates with the feed port of the magnetization pipe 6 and the exit port of the second filtering component 10. An exit port of the magnetization pipe 6 communicates with exit line 8 which communicates with an outlet faucet 80 such as gooseneck faucet to outlet water. The first manifold SW1 controls whether the multiple-loop control operates.

Magnetization pipe 6 has magnetized circular sheets 61 disposed at intervals in manner of NN poles or SS poles. The magnetic force generated by the magnetized circular sheets 61 changes change angles of hydrogen-oxygen bonds of water molecules, and refine into small molecules and intensify the molecules and enhance the energy for the water liquid. Such water molecules are more easily absorbed by the human body and promote metabolism to improve chronic disease.

An exit port of the fluid pipe 7 connects to the third manifold SW3 which controls whether a fluid magnetization treatment operates or not. The fluid pipe 7 has a porous far-infrared ceramic sheet 71 through which fluid of the tea or drink can flow through. With the loop effect of the pump M, the fluid (water liquid) can absorb far-infrared energy, and be magnetized by the magnetic circular sheets 61.

Moreover, the fluid pipe 7 further has a dust-proof cover 72 and a dust-proof tube 73. The dust-proof cover 72 prevents dust, bacteria and other impurities from entering into the fluid pipe 7. The dust-proof tube 73 is used to guide the water liquid such as tea or drinks into the fluid pipe 7 to achieve the dust-proof effect.

Please also refer to FIG. 5 to FIG. 11 which show the water treatment device according to one embodiment of the invention being mounted in a cabinet body. The simplified configuration of the water treatment device allows the water treatment compatible with a cabinet body 12. The control module 3 can be mounted to a stretchable drawer (open type) 11 so that the control module 3 can be exposed from the drawer 11 by pulling the drawer 11 out to facilitate the operation of the control module 3.

Figure 12:
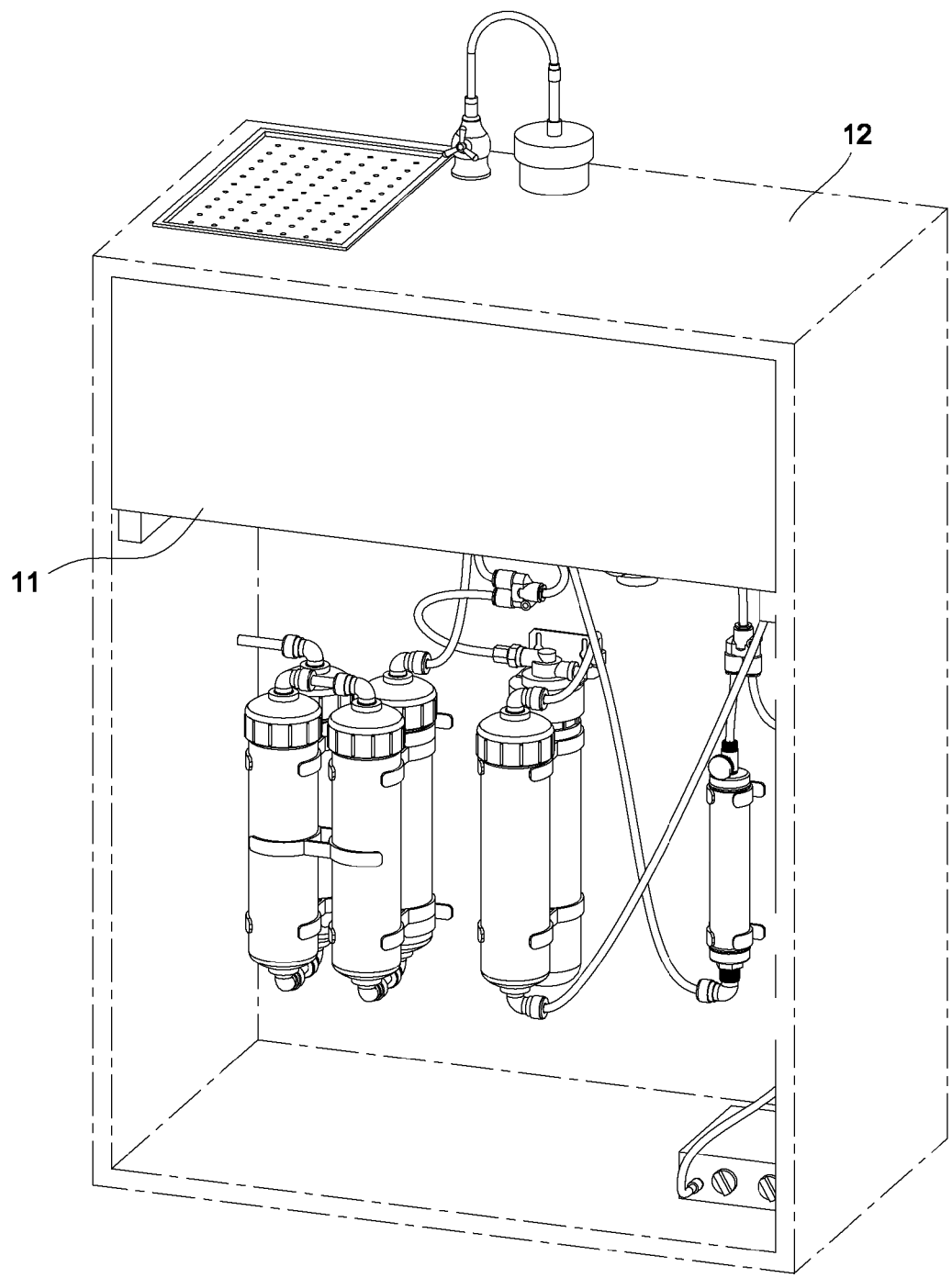
FIG. 12 is a perspective view of a water treatment device in another cabinet according to one embodiment of the invention.
Figure 13:
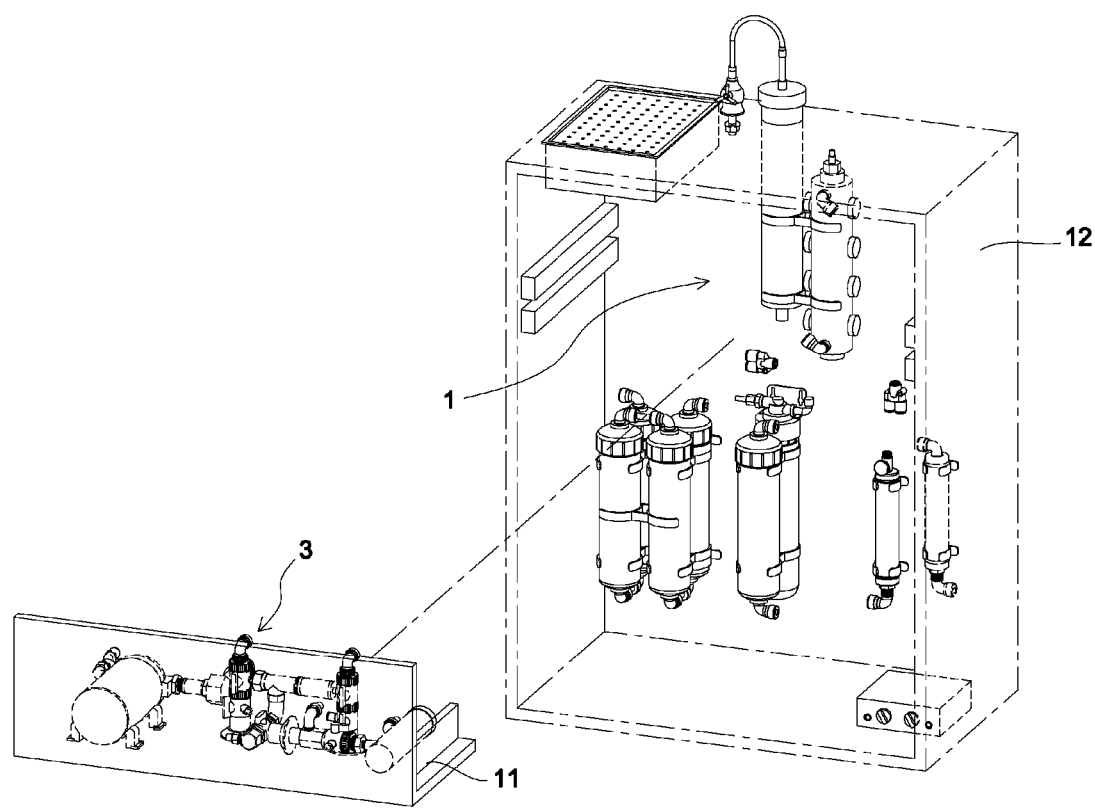
FIG. 13 is a perspective view of a control module pulled out of a water treatment device in a cabinet according to one embodiment of the invention.

Please also refer to FIG. 12 and FIG. 13, a drawer 11 of another cabinet 12 is different from the aforementioned system. The difference is that the drawer 11 of the cabinet 12 in FIG. 12 and FIG. 13 is of close type, while that in this embodiment is of open type. For both types, they have the same out-pulling effect.

Please refer to FIG. 1 again, when the water treatment device 1 is subject to single-filtering magnetization process, the upper manifold 311 and the lower manifold 312 of the first tube 31 and the second manifold SW2 are opened, while the first manifold SW1 and the third manifold SW3 are closed. The water liquid flows in turns through the feed line 2, the first filtering component 9, the first tube 31 of the control module 3, the energy pipe 4 (and the flow control valve 41), the light wave pipe assembly 5 (in turns through the upper diversion tube 51, between the outer tube 50 and the transparent tube 53, and through the lower diversion tube 52), the second filtering component 10, the magnetizing pipe 6, the exit line 8 and the outlet faucet 80. When the water liquid is at the control module 3, the upper manifold 321 of the second tube 32 is opened so that part of the water liquid flows through the calcium-ion bead filtering pipe 323 and comes to meet the water liquid from the energy pipe 4. Thereby, the water liquid can be subject to the filtering, light wave energizing and magnetizing during the single-filtering magnetizing treatment. Specifically, the filtering effect of the first filtering component 9, the far-infrared effect of the far-infrared material 42 of the energy tube 4, the light wave electromagnetic field effect of the wave guide tube 54 of the light wave pipe assembly 5, the magnetization of the powerful magnet 55, the filtering effect of the second filtering component 10 and the magnetizing effect of the magnetic circular sheets 61 of the magnetizing tube 6 work together to refine the liquid molecules of water liquid, improve water quality and liquid oxygen content, and thus make the water liquid more easily to be absorbed by the human body and improve chronic diseases.

When the water treatment device 1 is subject to a plurality of loop processes, the lower manifold 312 and second manifold SW2 of the first pipe 31 are shut down while the, first manifold SW1 and the third manifold SW3 turn on. The water liquid flows in turns through the first manifold 311 of the first tube 31 of the control module 3, the energy pipe 4 (and the flow control valve 41), the light wave pipe assembly 5 (in turns, through the upper diversion tube 51, between the outer tube 50 and the transparent tube 53, and through the lower diversion tube 52), the pump M. the water liquid flows through the first manifold SW1, and continues another loop from the first manifold 311 of the first tube 31 of the control module 3. When the water liquid is at the control module 3, the upper manifold 321 of the second tube 32 can be opened to allow part of the water liquid to flow through the calcium-ion bead filtering pipe 323 and then come to meet the water liquid from the energy pipe 4. After the water liquid is subject to several times of the far-infrared effect of the far-infrared material 42 of the energy pipe 4, the light wave electromagnetic field of the wave guide tube 54 of the light wave pipe assembly 5 and the magnetizing effect of the powerful magnet 55, and treated via multiple of light wave magnetizing loops, the effectiveness of water quality can be enhanced.

Figure 2:
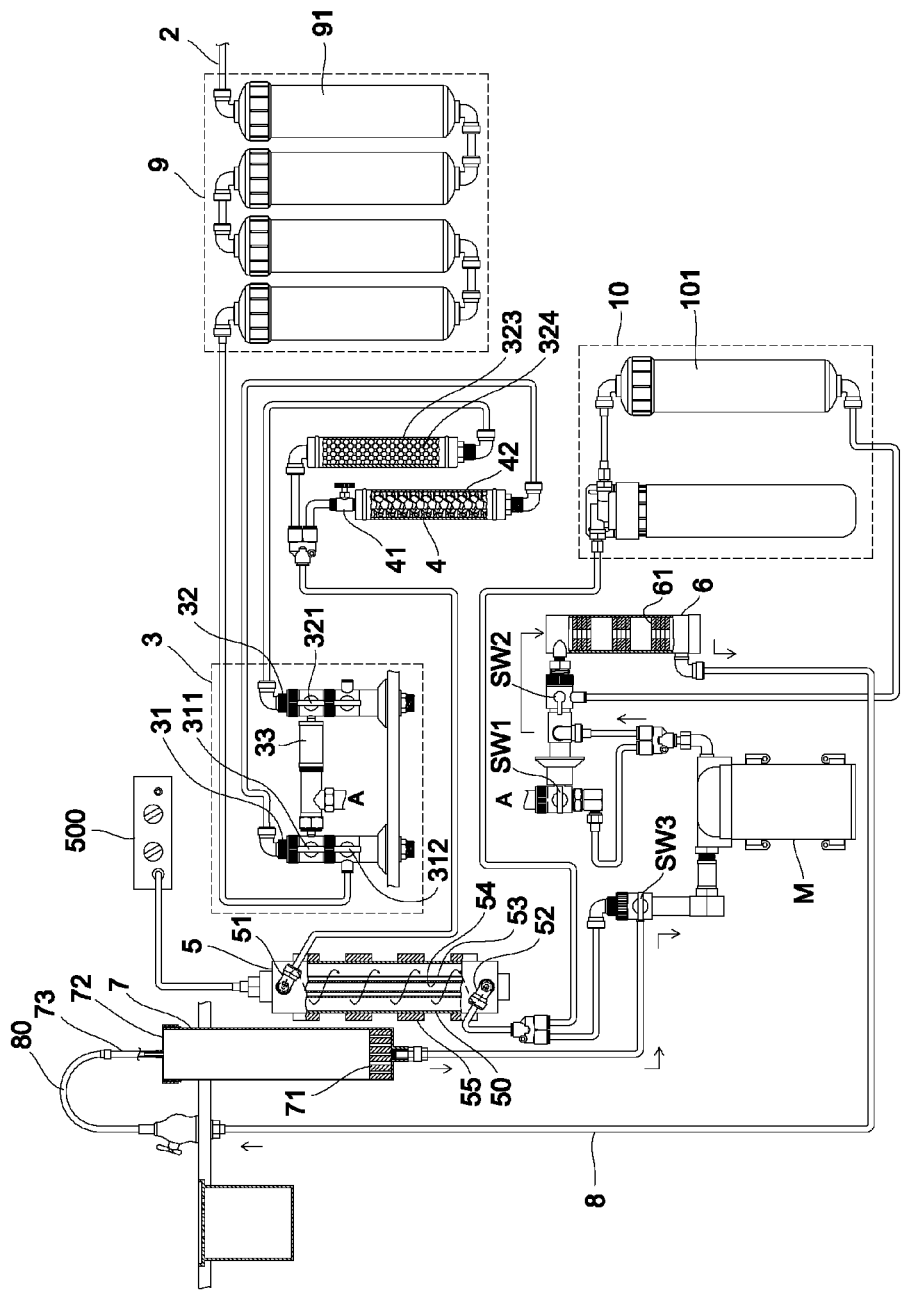
FIG. 2 is a schematic view of magnetization of fluid in a water treatment device according to one embodiment of the invention.

Please again refer to FIG. 2 which is a schematic view showing the treatment of magnetizing the fluid in the water treatment device according to one embodiment of the invention. When the water treatment device 1 is running the fluid magnetizing treatment, the first manifold SW1 is closed while the second manifold SW2 and the third manifold SW3 is opened. The water liquid flows in turns through the fluid pipe 7, the pump M, the magnetizing pipe 6, the exit line 8 and the outlet faucet 80. After the water liquid such as tea and drinks is charged into the fluid pipe 7, the water liquid is subject to the far-infrared effect of the fluid pipe 7 and then the magnetizing effect of the magnetizing pipe 6. Thereby, the water liquid can be refined to be small molecules which can be more neatly arranged to intensify the molecules of the water liquid and enhance the energy of the water liquid. Therefore the molecules of the water liquid can be more easily absorbed by the human body to promote metabolism and improve chronic diseases.

Figure 5:
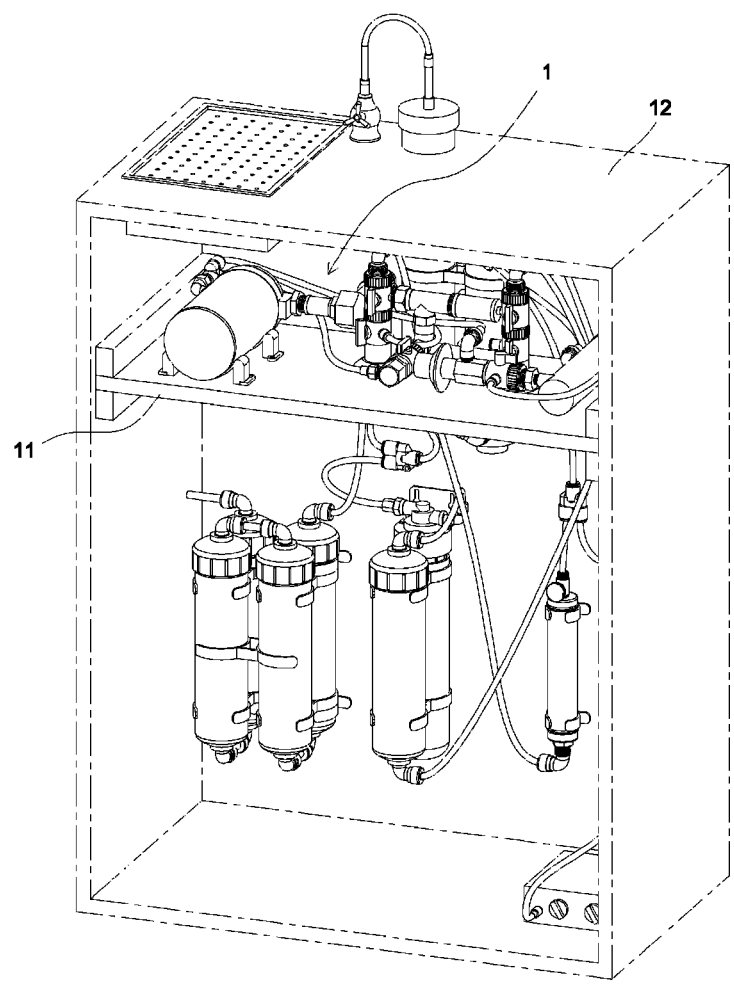
FIG. 5 is a perspective view of a water treatment device in a cabinet according to one embodiment of the invention.
Figure 6:
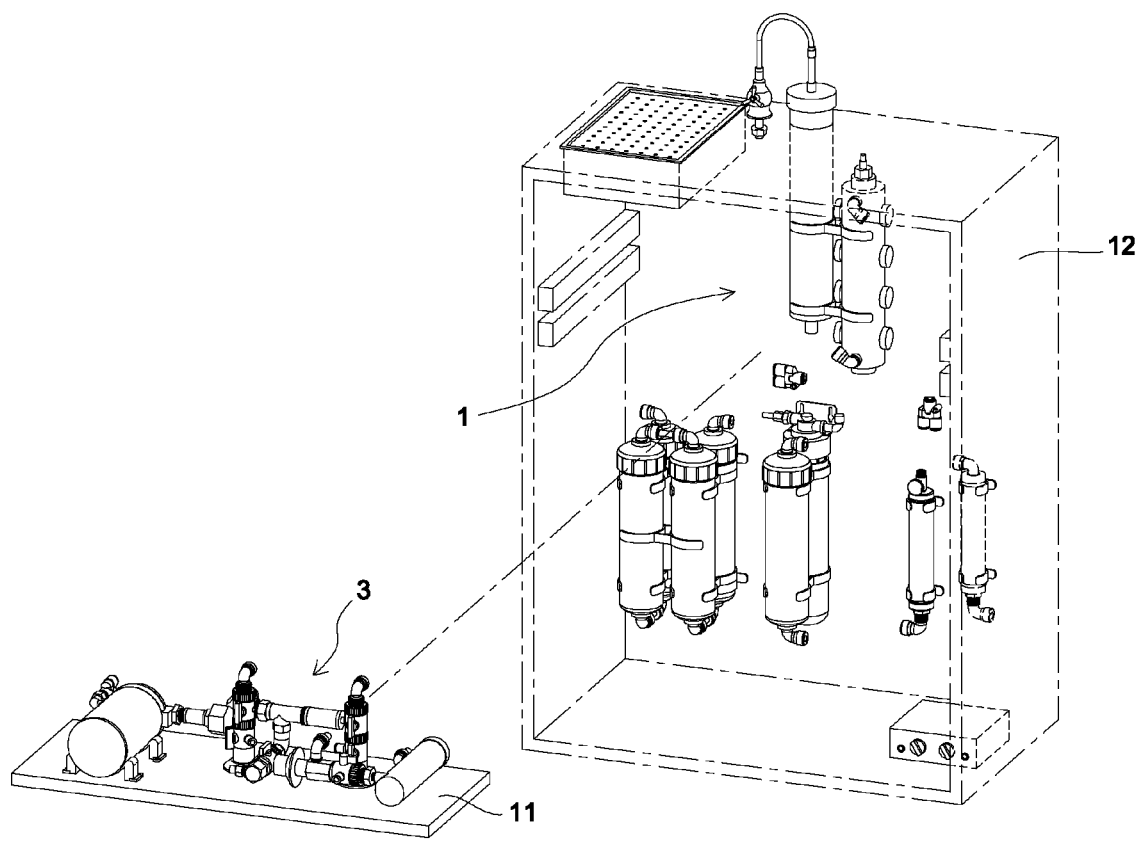
FIG. 6 is a schematic exploded view of a part of a water treatment device in a cabinet according to one embodiment of the invention.
Figure 7:
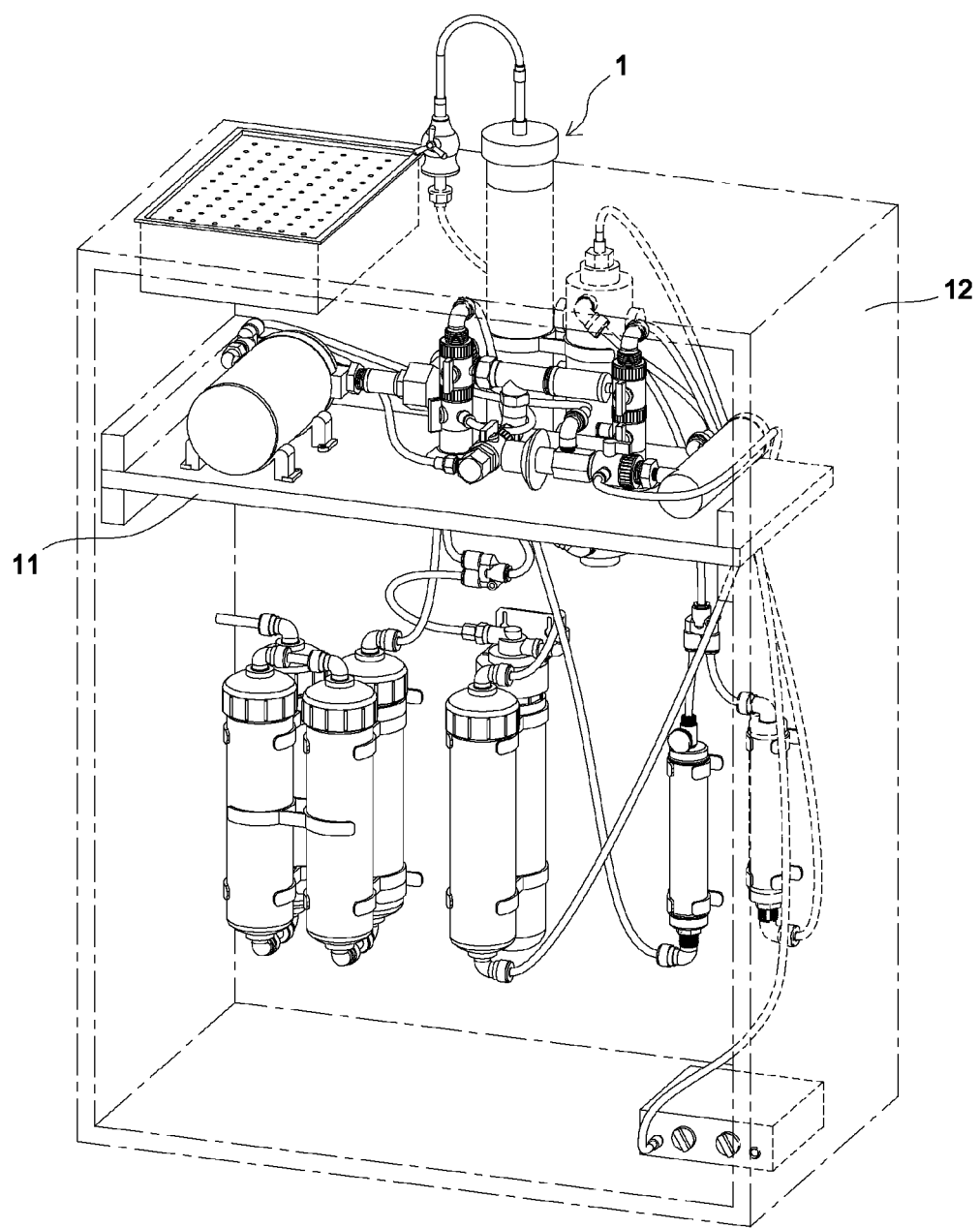
FIG. 7 is a schematic view of a water treatment device in a cabinet according to one embodiment of the invention.
Figure 8:
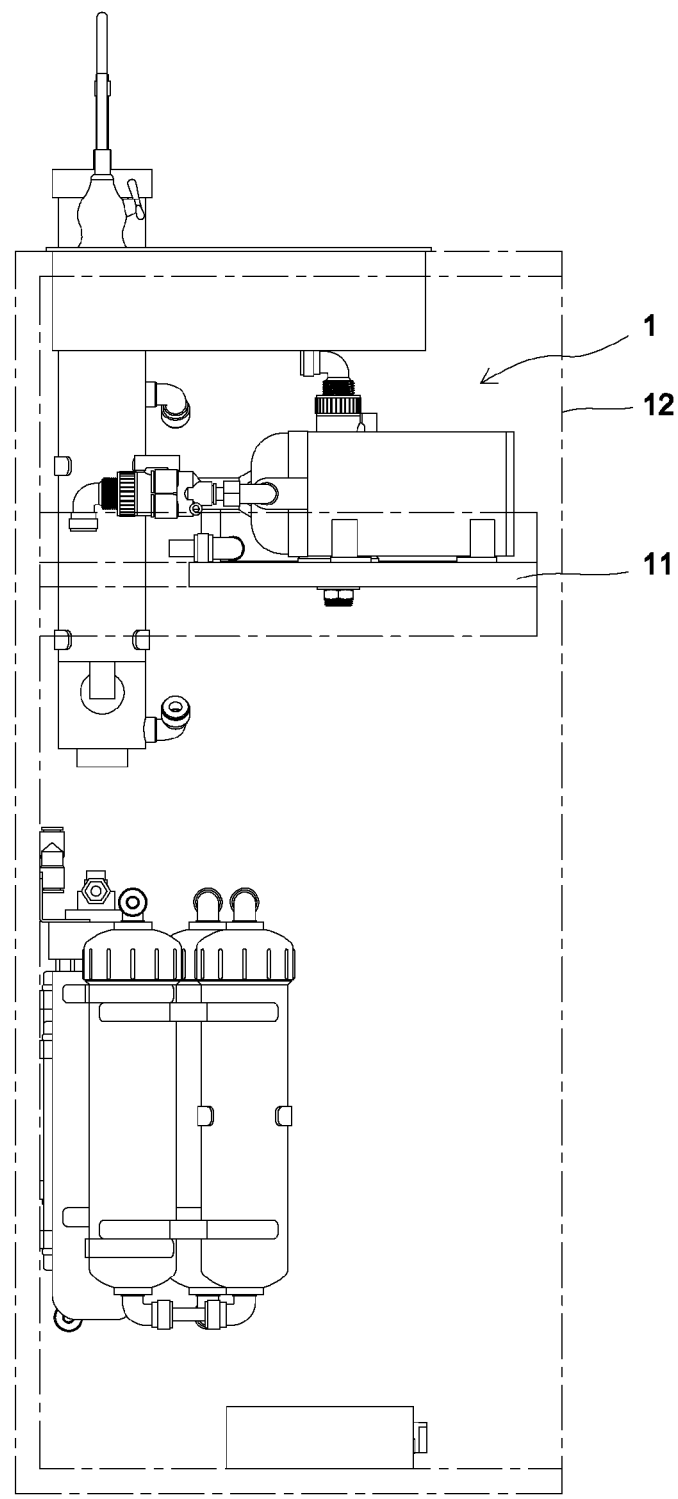
FIG. 8 is a side view of a water treatment device in a cabinet according to one embodiment of the invention.
Figure 9:
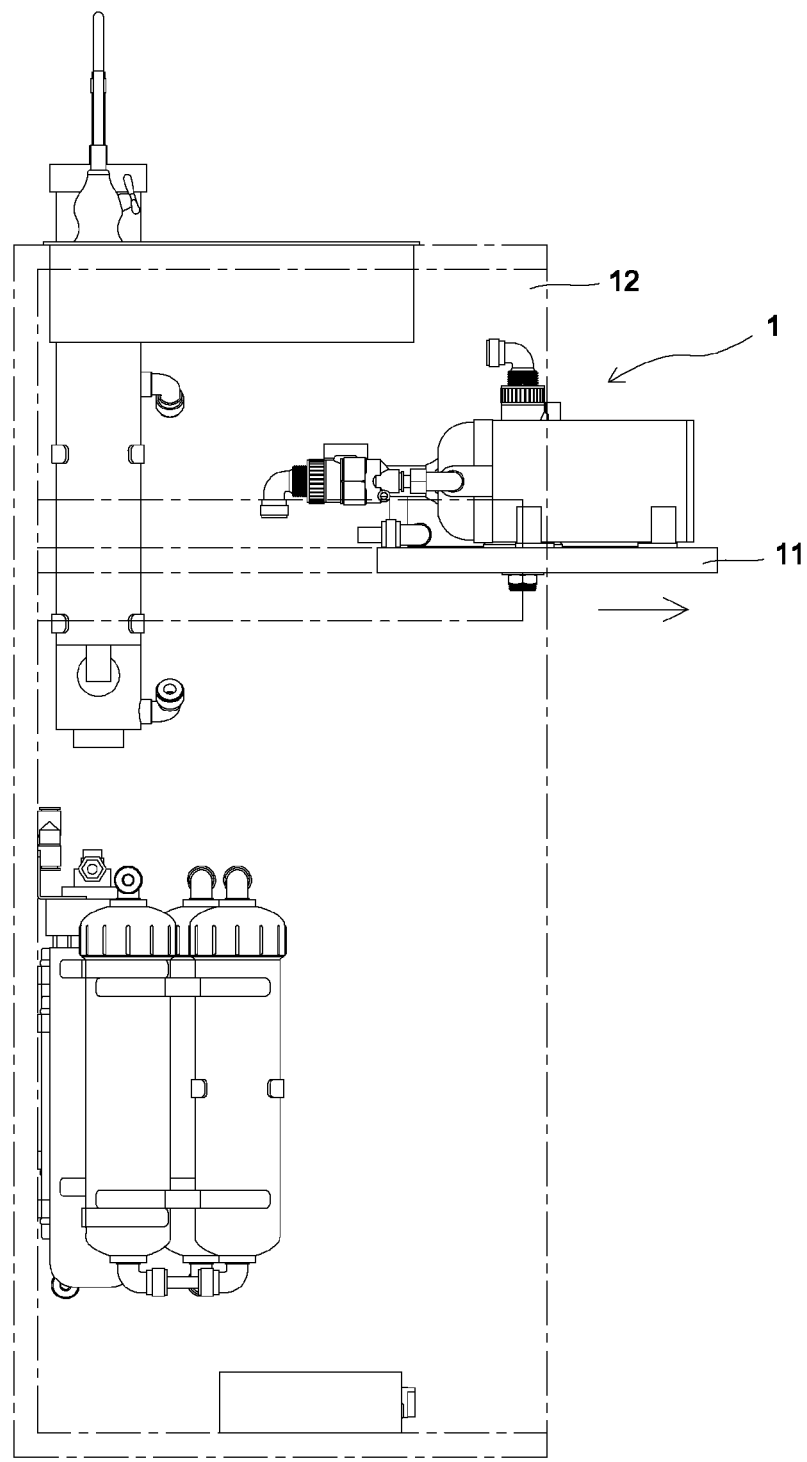
FIG. 9 is a side view of a control module pulled out of a water treatment device in a cabinet according to one embodiment of the invention.
Figure 10:
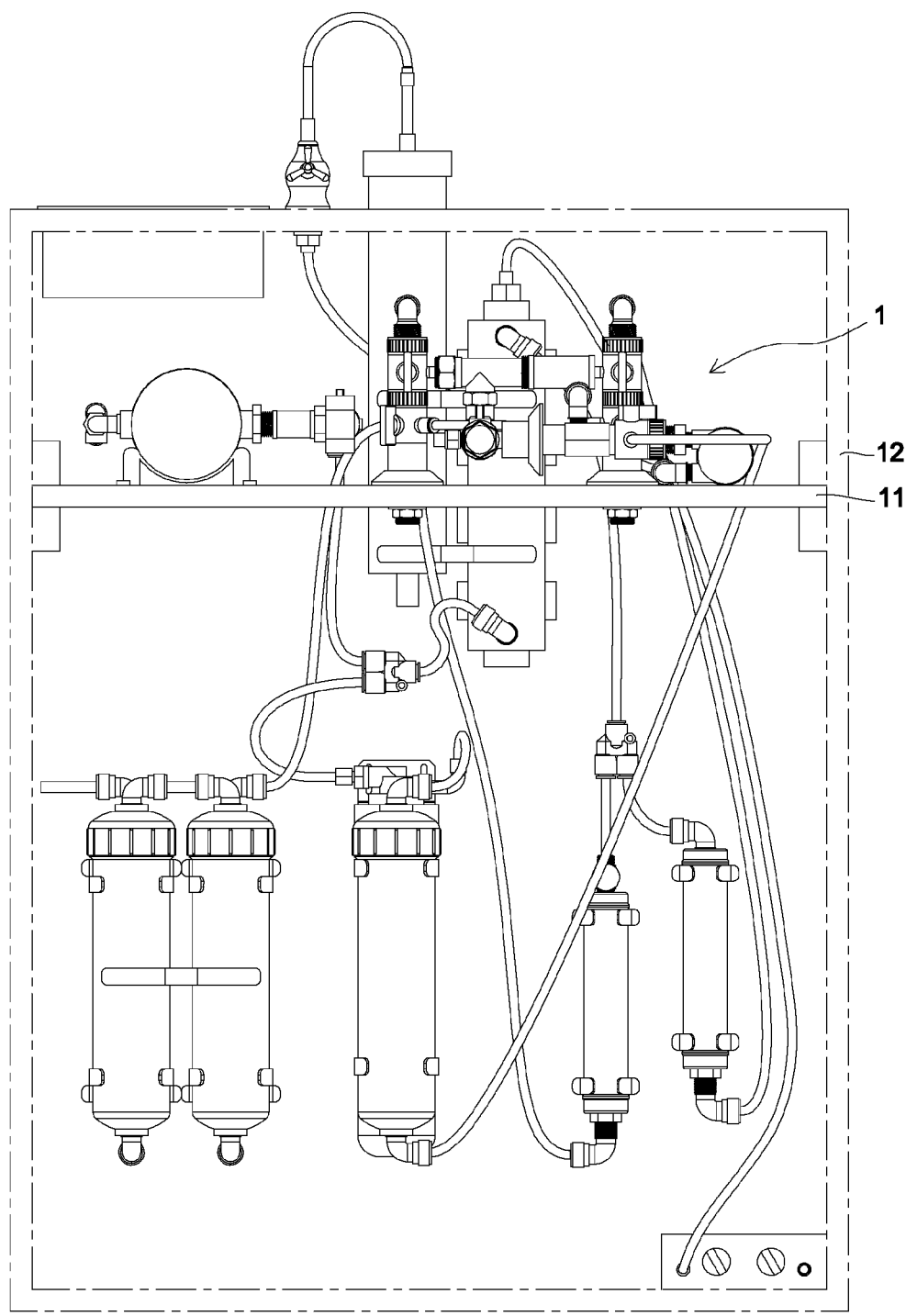
FIG. 10 is a front view of a water treatment device according to one embodiment of the invention.
Figure 11:
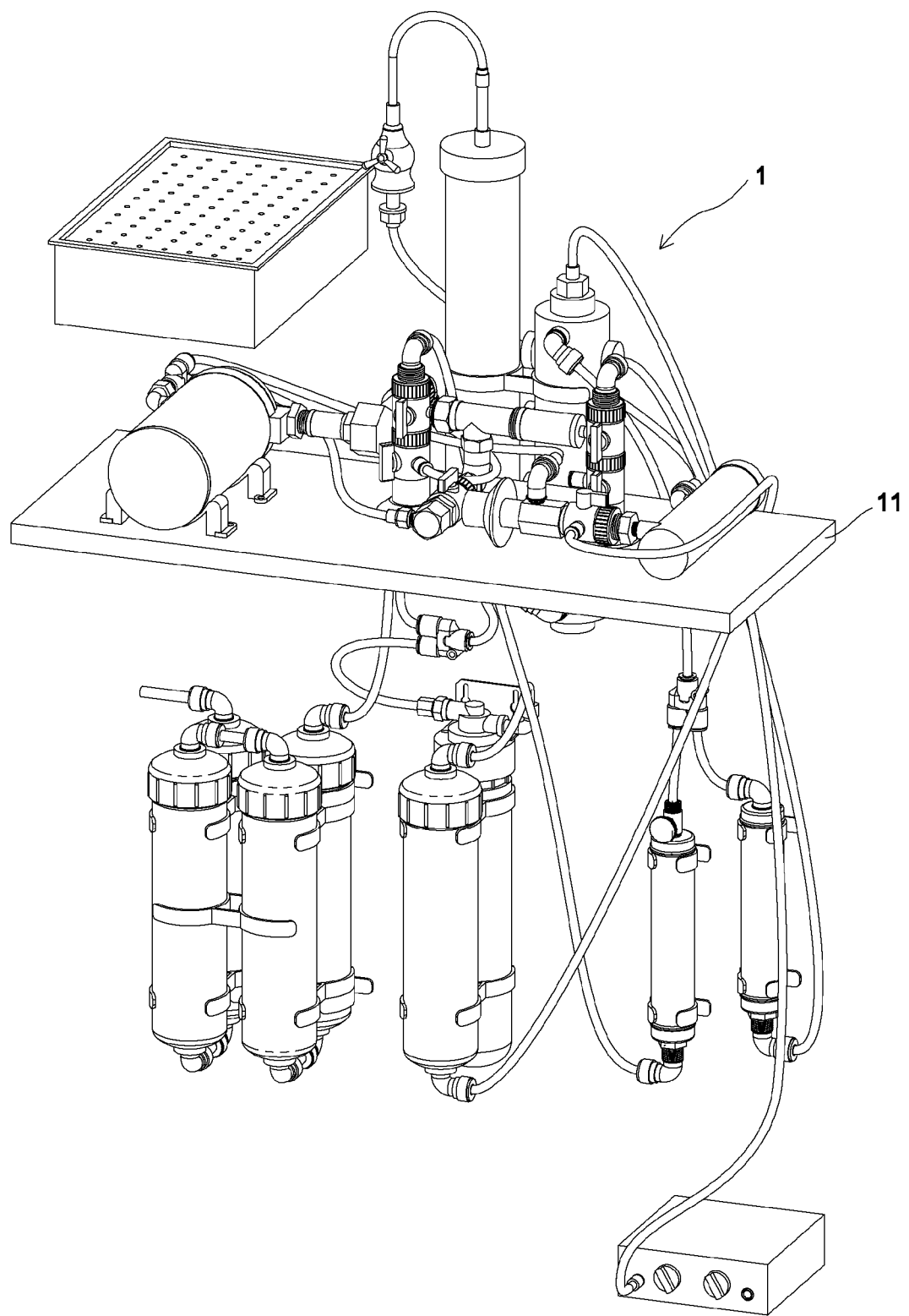
FIG. 11 is a schematic view of a part of a water treatment device according to one embodiment of the invention.

Furthermore, in the case that the fluid pipe 7 is arranged adjacent to the light wave pipe assembly 5 as shown in FIG. 5, the water liquid in the fluid pipe 7 is affected by not only the far-infrared effect but also the electromagnetic field to form the high-energy small-molecule water liquid, for the light electromagnetic field has an effective distance (about 5 cm).

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A water treatment device, characterized by comprising a control module, communicating with a feed line;
an energy pipe, communicating with the control module, and a far-infrared material is placed inside the energy pipe;
a light wave pipe assembly and a light wave generator communicated with each other, respectively communicating with the energy pipe and generated light waves guided into the light wave pipe assembly; the light wave pipe assembly has an outer tube, an upper diversion tube, a lower diversion tube, a transparent tube and a wave guide tube; the transparent tube is mounted inside the outer tube; the wave guide tube is mounted inside the transparent tube so as to allow the wave guide tube to guide the light waves; the upper diversion tube is mounted at a feed port of the outer tube and communicates with the exit port of the energy pipe; and the lower diversion tube is mounted at the exit port of the outer tube; and
a magnetizing pipe, communicating with the light wave pipe assembly through a second manifold communicated with a first manifold which connects to a pump and then the second manifold connected to an exit line, and a plurality of magnetic circular sheets are mounted in the magnetizing pipe separatedly, and N poles or S poles of the magnetic circular sheets are opposite to each other;
wherein the control module communicates with a calcium-ion bead filtering tube and an exit port of the alcium-ion bead filtering tube communicates with the exit port of the energy tube.

2. The water treatment device of claim 1, characterized in that the pump communicates with an exit port of the light wave pipe assembly and an exit port of a fluid pipe through a third manifold; and a porous far-infrared ceramic sheet is mounted inside the fluid pipe and has a dust-proof cover and a dust-proof tube.

3. The water treatment device of claim 1, characterized in that an exit port of the energy pipe communicates with a flow control valve, and then a feed port of the light wave pipe assembly.

4. The water treatment device of claim 1, characterized in that a first filtering component connects the feed line to the control module, and a second filtering component connects the light wave pipe assembly to the second manifold.

5. The water treatment device of claim 1, characterized in that the transparent tube is a quartz tube; the wave guide tube is made of metallic conductor; and outer walls of the outer tube have a plurality of magnets having N, S poles corresponding to each other.

6. The water treatment device of claim 1, characterized in that the upper diversion tube is of L-shaped structure and downwardly mounted; the upper diversion tube is of L-shaped structure and upwardly mounted; the upper diversion tube is positioned in a right-left reverse manner to the lower diversion tube; one end of the upper diversion tube communicating with the outer tube has an upper flowing port in the same direction as the opposite end of the upper diversion tube distant from the outer tube; and one end of the lower diversion tube communicating with the outer tube has a lower flowing port in the same direction as the opposite end of the lower diversion tube distant from the outer tube.

7. The water treatment device of claim 1, characterized in that the control module comprises a first tube and a second tube; a feed port of the first tube communicates with the feed line; an exit port of the first tube communicates with a feed port of the energy pipe; the first tube has an upper manifold and a lower manifold; the second tube has an upper manifold and a lower manifold; the upper manifold of the first tube communicates with the upper manifold of the second tube through a connecting tube; an exit port of the second tube communicates with a calcium-ion bead filtering pipe; and an exit port of the calcium-ion bead filtering pipe communicates with an exit port of the energy pipe.

* * * * *